March 26, 1929.   T. A. SISSOM   1,706,418
APPARATUS FOR SPRAYING PLANTS AND TREES
Filed Nov. 1, 1926
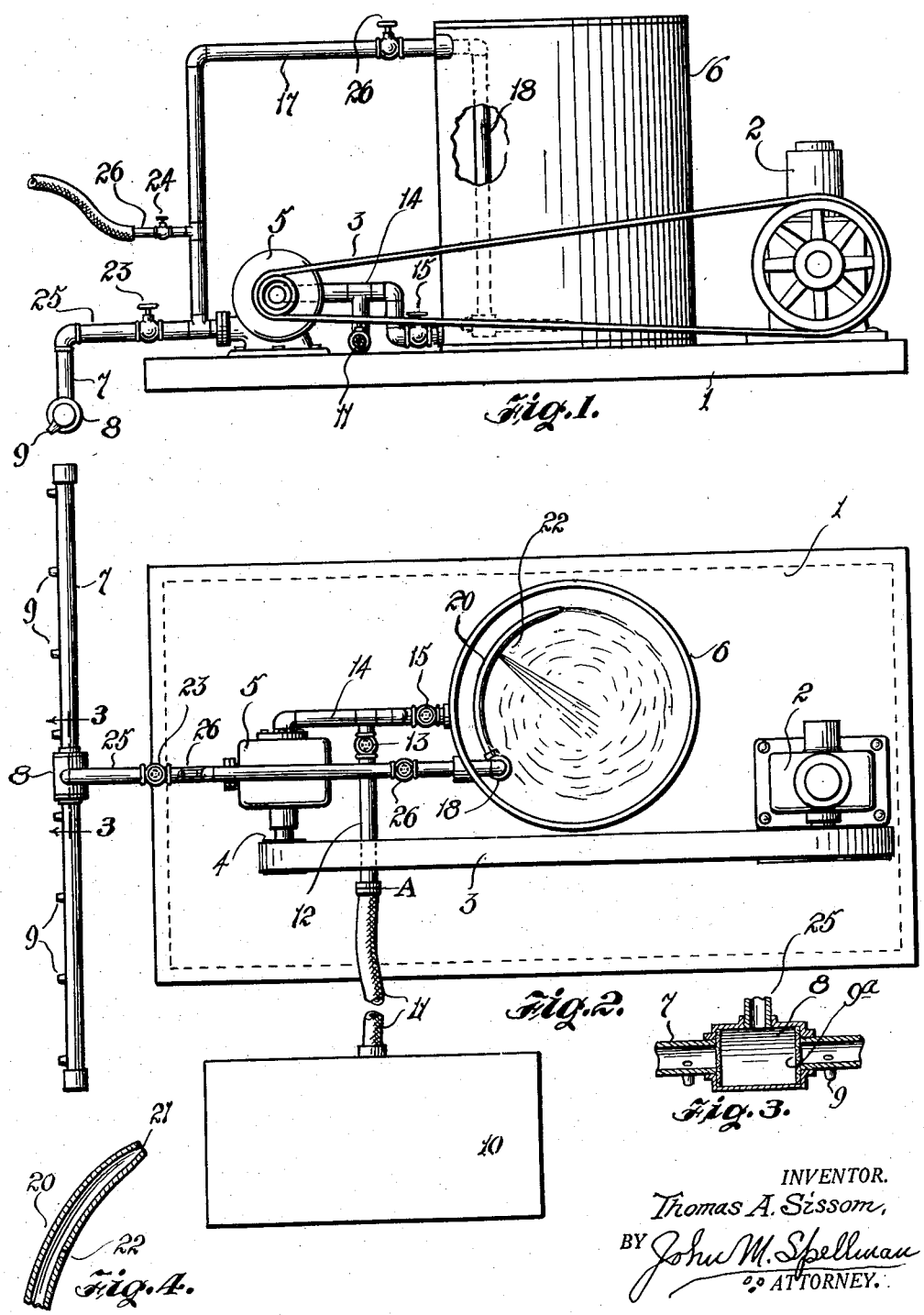

Patented Mar. 26, 1929.

1,706,418

UNITED STATES PATENT OFFICE.

THOMAS A. SISSOM, OF ITALY, TEXAS.

APPARATUS FOR SPRAYING PLANTS AND TREES.

Application filed November 1, 1926. Serial No. 145,471.

This invention relates to new and useful improvements in apparatus for treating plants, particularly cotton plants, to destroy and remove injurious insects, parasites and the like or to treat the plants for blight, etc.

One of the particular features of the invention is to provide a machine of this class of as few parts as possible and by means of which the plants may be treated economically.

Another and particular feature of the invention is to provide means for maintaining the liquid which is sprayed upon the plants in constant motion so as to keep it thoroughly mixed and impregnated with the poison or material in the liquid body.

With the above and other and further objects in view the invention will be better understood from a perusal of the following detailed description, taken in connection with the accompanying drawings and wherein:

Figure 1 is a side elevational view of the invention.

Figure 2 is a top or plan view.

Figure 3 is a detail partial longitudinal sectional view along line 3—3 of Figure 2; and Figure 4 is a detail sectional view of the mixing element.

Proceeding in accordance with the drawings and wherein similar numerals designate the various parts, 1 denotes a platform which may be the bed of a wagon or truck and supported thereupon is an internal combustion engine 2. The engine is connected by belt 3 to the pulley 4 of a pump 5.

The platform also carries a mixing tank 6 in which the liquid for treating or spraying the plants is contained, and to the rear of the platform or support is a distributor pipe 7 including an enlarged portion 8, see Figure 3. On the distributor pipe 7 are spaced a number of nipples 9 through which the liquid is sprayed.

A tank 10 or other form of water supply is situated at a convenient point and includes a connection for a flexible hose 11, the inner end of which is connected to a pipe 12, and which includes a valve 13.

Water from the tank 10 is drawn by the pump through pipe 14 which is connected also to the tank 6 and includes a valve 15. The latter valve is closed during the initial operation of filling the tank 6 and mixing it with the material to be sprayed on the plants and the valve 13 is opened. After passing through the pump the water is conveyed through a pipe 17 and passes into the container 6 through a pipe 18. This pipe is directed along the side of the tank 6 and has connected to its lower end a curved tube 20. This tube, see Figure 4, has an opening in its free end at 21, the opening being relatively small. A short way inward from the opening 21 is another opening 22. The water entering the tank under pressure of the pump will travel around in the tank in a whirling motion and the powder or poison placed in this tank will be kept thoroughly mixed with the water. In the center of the volume of water being mixed some of the powder or material will be eddied in towards the center of the tank. The hole 22 is to permit a small jet or stream of water to be ejected or forced across the center as shown in Figure 2 and which thus keeps the entire contents in the tank thoroughly mixed. During the initial mixing process valves 23 and 24 on the pipe 25 and small pipe 26 are closed. Attached to the small lateral pipe 26 is a flexible hose for spraying trees and other objects and surfaces.

In the enlarged portion 8 of pipe 7 are strainers 9ª which enable foreign matter to be trapped in the passage outward of the liquid. This part of the apparatus may be easily taken apart for cleaning.

In the operation of the apparatus the engine is started to operate the pump and the container 6 is filled with water. The plant-treating material which may be in powdered or liquid form is placed in the container and valves 15, 23 and 24 are closed. When the water is fully charged with the poison or plant treating material the valves 15 and 23 are opened and valve 13 is closed. The liquid is now forced outward from the pump through the pipe 25 into pipe 7 and dispersed through the nipples 9.

A practical demonstration of the apparatus has proven that the whirling motion of the liquid in addition to the opening 22 keeps the container contents thoroughly mixed and that the liquid is forced through the nipples 9 forming a mist which covers the plants thoroughly.

The liquid is controlled in its passage outward by the valve 26 and the pressure controlled. Since all of the liquid that is carried outward under pressure by the pump can not be forced fast enough through the nipples a portion of this liquid returns to the container 6 through pipe 17. The liquid is thus continually carried around until the container is exhausted.

Obviously alterations and changes may be made in the construction of the invention as it is not to be understood as being limited to the particular construction here shown, such changes and alterations to come within the scope and meaning of the appended claim.

What is claimed is:

An apparatus of the class described, comprising a cylindrical tank for liquid to be sprayed, said tank having a pipe connected to the upper end thereof and extending downwardly to the lower part of the tank, said pipe having on its lower end a curved tubular extension positioned adjacent to and conforming to the shape of the cylindrical wall of said tank, said extension being provided with a reduced opening to cause the liquid as it enters the tank to be moved circularly around the tank to mix and agitate the liquid and the poison contained therein, said curved tubular extension also having an opening at approximately its center to cause the liquid to be forced in a radial direction across the central portion of the tank to prevent a sediment forming at the center of the tank and to maintain the liquid contents in an agitated and mixed condition.

In testimony whereof I affix my signature.

THOMAS A. SISSOM.